US008208653B2

(12) United States Patent
Eo et al.

(10) Patent No.: US 8,208,653 B2

(45) Date of Patent: Jun. 26, 2012

(54) METHOD AND APPARATUS FOR REPRODUCING MULTI-CHANNEL SOUND USING CABLE/WIRELESS DEVICE

(75) Inventors: Kil-su Eo, Seoul (KR); Bong-hyun Cho, Seongnam-si (KR); Hee-jeong Bae, Osan-si (KR)

(73) Assignee: Samsung Electronics Co., Ltd., Suwon-si (JP)

(*) Notice: Subject to any disclaimer, the term of this patent is extended or adjusted under 35 U.S.C. 154(b) by 1602 days.

(21) Appl. No.: 11/634,245

(22) Filed: Dec. 6, 2006

(65) Prior Publication Data

US 2007/0211907 A1 Sep. 13, 2007

(30) Foreign Application Priority Data

Mar. 8, 2006 (KR) ........................ 10-2006-0021841

(51) Int. Cl.

*H04B 3/00* (2006.01)
*H04B 5/00* (2006.01)
*H04R 1/02* (2006.01)
*H04R 9/06* (2006.01)

(52) U.S. Cl. ............... 381/80; 381/77; 381/79; 381/334

(58) Field of Classification Search .................... 381/79, 381/80, 77, 82, 334
See application file for complete search history.

(56) References Cited

U.S. PATENT DOCUMENTS

2004/0071059 A1* 4/2004 Kikuchi et al. ............ 369/47.23
2005/0135634 A1 6/2005 Wu
2005/0152557 A1* 7/2005 Sasaki et al. .................... 381/58

FOREIGN PATENT DOCUMENTS

JP 2004-120407 A 4/2004
KR 10-2005-0017135 A 2/2005

* cited by examiner

*Primary Examiner* — Vivian Chin
*Assistant Examiner* — Douglas Suthers
(74) *Attorney, Agent, or Firm* — Sughrue Mion, PLLC

(57) ABSTRACT

A multi-channel music reproducing apparatus and method using a wired and/or wireless communication system are provided. The method includes confirming neighboring devices capable of wired and/or wireless communication; allocating audio channel information to confirmed neighboring devices; encoding the channel information and reproduction synchronization information as index information; transmitting the index information together with a music data file; receiving the encoded index information and music data; decoding the allocated channel information and the synchronization information; and outputting music data corresponding to the allocated channel.

18 Claims, 4 Drawing Sheets

METHOD AND APPARATUS FOR REPRODUCING MULTI-CHANNEL SOUND USING CABLE/WIRELESS DEVICE

CROSS-REFERENCE TO RELATED PATENT APPLICATIONS

This application claims priority from Korean Patent Application No. 10-2006-0021841, filed on Mar. 8, 2006, in the Korean Intellectual Property Office, the disclosure of which is incorporated herein in its entirety by reference.

BACKGROUND OF THE INVENTION

1. Field of the Invention

The present invention relates to a music reproducing apparatus, and more particularly, to a multi-channel music reproducing apparatus and method using a plurality of wired and/or wireless communication systems.

2. Description of the Related Art

Generally, a music reproducing apparatus such as an MP3 player or a portable media player (PMP) decodes a stored music file and outputs the decoded file to an embedded speaker.

FIG. 1 is a block diagram of a conventional music reproducing apparatus;

The conventional music reproducing apparatus is composed of a storage unit 110, a decoder 120, and an output unit 130.

Referring to FIG. 1, a music file compressed using an MP3 standard is stored in the storage unit 110. The decoder 120 decodes the music file stored in the storage unit 110 into a form that can be reproduced. The output unit 130 reproduces the decoded music file through a speaker.

However, although the conventional music reproducing apparatus provides a spatial effect using left and right speakers or earphones, the music sound is generated from almost identical output positions. Therefore, the reproduction of a stereo effect is limited.

SUMMARY OF THE INVENTION

The present invention provides a method of reproducing multi-channel music by which any one of a plurality of devices capable of wired and/or wireless communication is set as a master device and the remaining devices are set as slave devices.

The present invention also provides a multi-channel music reproducing apparatus which can perform the multi-channel music reproducing method.

According to an aspect of the present invention, a multi-channel music reproducing method uses a plurality of communication devices. A reproducing method consistent with the present invention includes confirming neighboring devices capable of wired and/or wireless communication; allocating audio channel information to each confirmed neighboring device; encoding the channel information and reproduction synchronization information into index information; transmitting the index information together with a music data file; receiving the encoded index information and music data; decoding the channel information allocated to a current device and the reproduction synchronization information; and outputting music data corresponding to the allocated channel.

According to another aspect of the present invention, a multi-channel music reproducing apparatus includes a master unit operable to detect neighboring devices capable of wired and/or wireless communication, allocate audio channel information to each detected neighboring device, encode the channel information and reproduction synchronization information into index information, and transmit the index information together with a music data file; and at least one slave unit operable to receive the encoded index information and music data from the master unit, decode the channel information allocated to the at least one slave unit, decode the synchronization information, and output music data corresponding to the allocated channel.

According to another aspect of the present invention, a music reproducing apparatus includes a control unit operable to detect neighboring devices capable of wired and/or wireless communication, assign an ID to each detected neighboring device, allocate audio channel information to respective IDs, and generate synchronization information to ensure that audio is reproduced simultaneously with each detected neighboring device; an information encoding unit operable to encode the ID information, the audio channel information and the synchronization information generated in the control unit into index information; a transmission unit operable to add the index information processed in the information encoding unit to a music file and transmit the music file to each detected neighboring device; a reception unit operable to receive the index information and the music file in units of packets from the transmission unit; an information decoding unit operable to decode the index information received by the reception unit and extract the channel information and the synchronization information; and a music decoder unit operable to confirm the channel information from the index information decoded by the information decoding unit and decode music data of a corresponding channel from the music file received by the reception unit.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
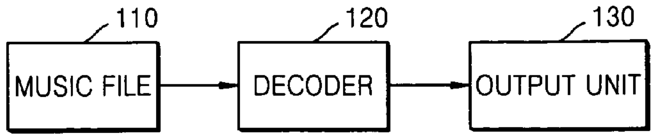
FIG. 1 (PRIOR ART)
FIG. 1 is a block diagram of a conventional music reproducing apparatus.
Figure 2:
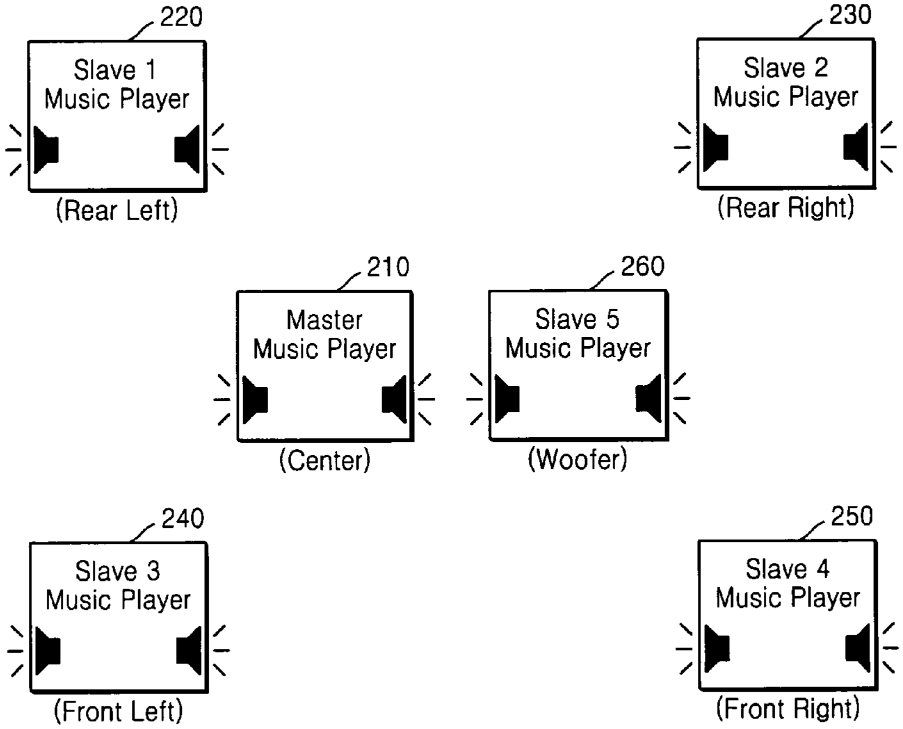
FIG. 2 illustrates a 5.1-channel music reproducing system for performing a method of reproducing multi-channel music according to an embodiment of the present invention.

FIG. 2 illustrates a 5.1-channel music reproducing system for performing a method of reproducing multi-channel music according to an embodiment of the present invention.

The multi-channel music reproducing system of the present invention sets any one of a plurality wired and/or wireless communication devices as a master device and sets the remaining devices as slave devices. However, in order to reproduce sound with a stereo effect, the master device and slave devices are grouped together. An example of a grouping is illustrated in FIG. 2.

The multi-channel music reproducing system is composed of a master device 210 and a plurality of slave devices (slaves 1 through 5) 220-260. The slave devices 220-260 are connected to the master device 210 either by hard-wiring or wirelessly. Each of the master device 210 and slave devices 220-260 has an embedded speaker and wired and/or wireless communication blocks. The roles of the master device 210 and slave devices 220-260 with respect to transmitting and/or receiving information can be changed at any time. The number of slave devices that may be supported is determined by the wired and/or wireless communication method.

The master device 210 detects and/or confirms neighboring devices that are capable of wired and/or wireless communication and that are adjacent to the master device 210. The master device 210 then assigns IDs to the confirmed neighboring devices, e.g., slave devices 220-260. Also, the master device 210 allocates audio channel information to the master device 210 and the confirmed neighboring devices, hereinafter "slave devices", generates synchronization information for reproducing audio together with the slave devices 220-260, encodes the IDs, the channel information and the synchronization information, and transmits the encoded information and music data to the slave devices 220-260. For example, the master device 210 may be allocated a center channel, slave device 1 (220) may be allocated a rear left channel, slave device 2 (230) may be allocated a rear right channel, slave device 3 (240) may be allocated a front left channel, slave device 4 (250) may be allocated a front right channel, and slave device 5 (260) may be allocated a woofer channel.

Slave devices 220-260 receive music data and encoded data from the master device 210, and the slave devices 220-260 decode channel information, synchronization information and music data.

In the above example, the master device 210 and the slave devices 220-260 operate as a 5.1-channel music reproducing apparatus. However, the present invention is not limited to just this configuration.

Figure 3:
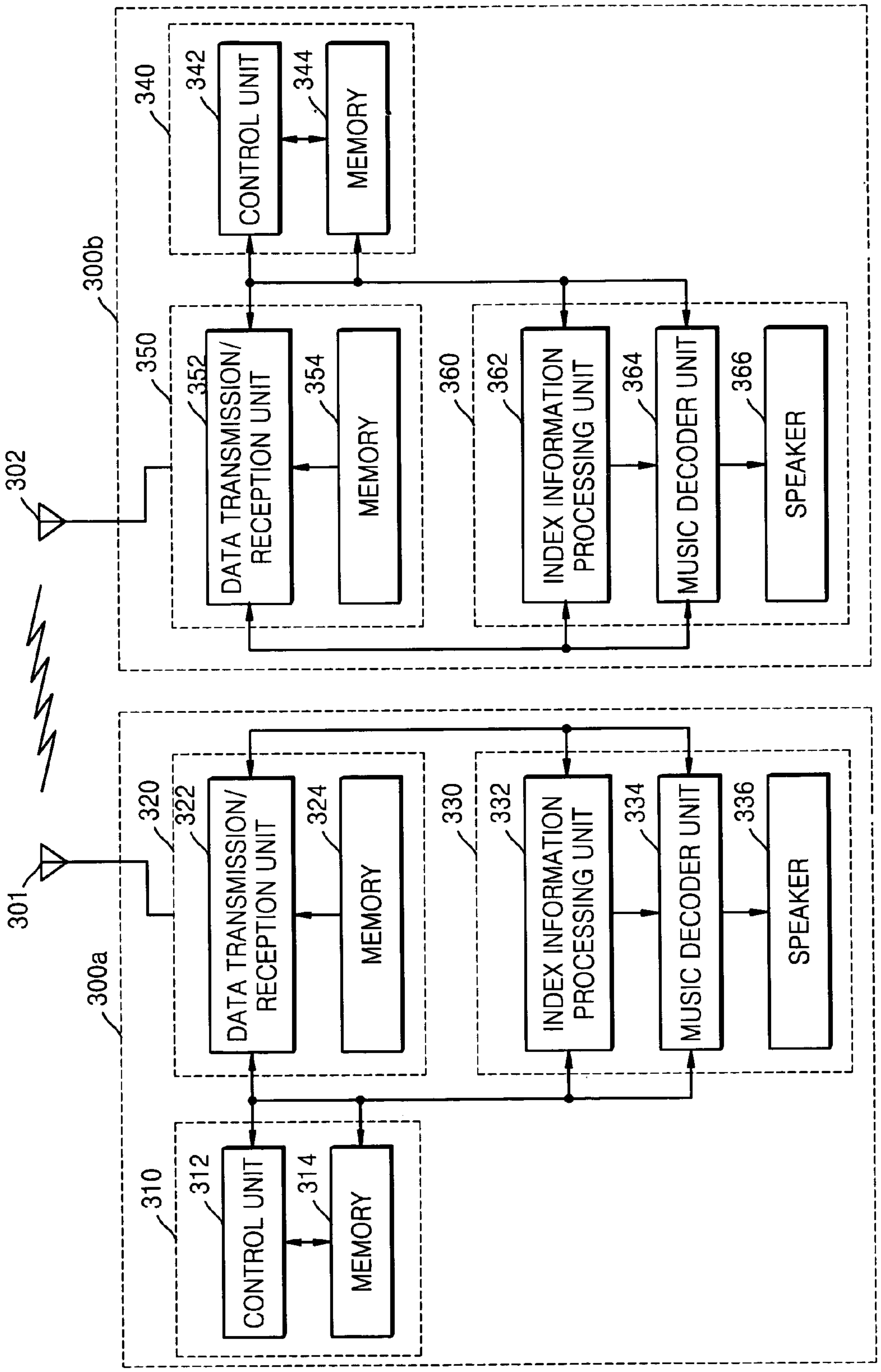
FIG. 3 is a detailed block diagram of a master device and slave devices of FIG. 2 according to an embodiment of the present invention.

FIG. 3 is a detailed block diagram of the master device and the slave devices of FIG. 2 according to an embodiment of the present invention.

The master device 300*a* is composed of a main control unit 310, a communication unit 320, and a signal processing unit 330. The main control unit 310 includes a control unit 312 and a memory 314 and controls a wired and/or wireless communication system. The communication unit 320 includes a data transmission and reception unit 322 and a memory 324, and transmits data to and receives data from neighboring devices. The signal processing unit 330 includes an index information processing unit 332, a music decoder unit 334, and a speaker 336. The signal processing unit 330 encodes and/or decodes index information and encodes music data.

The master device 300*a* will now be explained in more detail.

The control unit 312 controls wired and/or wireless communication of the data transmission and reception unit 322; confirms neighboring devices capable of wired and/or wireless communication; assigns IDs to each detected neighboring device, i.e., slave device; allocates audio channel information to each detected slave device; generates synchronization information for simultaneous reproduction of sound between each detected slave device and the master device 300*a*; controls encoding and decoding of the index information processing unit 332; and controls decoding of music in the music decoding unit 334. If, for example, a Bluetooth system is used as a wireless communication system, the control unit 312 selects either a synchronous connection oriented (SCO) link for transmitting voice or low-speed data, or an asynchronous connectionless link capable of transmitting high-speed data.

The memory 314 stores music files and a control program for the control unit 312. The music files are stored in the form of compressed data such as, for example, MP3 data or advanced audio codec (AAC) data. Also, the compressed music files have channel information, for example, 2 channels or 5.1 channels.

The data transmission and reception unit 322 transmits or receives IDs, index information and music data to or from each detected slave device connected to a wired and/or wireless network through an antenna 301 under the control of the control unit 312 for transmission and reception.

The memory 324 stores a data transmission and reception program for the data transmission and reception unit 322.

The index information processing unit 332 has an index encoder/decoder, and encodes and/or decodes ID information of each slave device capable of wired and/or wireless communication, audio channel information of each slave device, and synchronization information to ensure that the master device and, each slave device simultaneously output sound.

The music decoder unit 334 decodes a desired music file according to audio channel information.

The speaker 336 outputs an audio signal of the audio channel decoded by the music decoder unit 334. For example, the master device outputs a center channel audio signal.

Referring again to FIG. 3, the slave device 300*b* is composed of a main control unit 340, a communication unit 350, and a signal processing unit 360.

The main control unit 340 includes a control unit 342 and a memory 344, and controls a wired and/or wireless communication system. The communication unit 350 includes a data transmission and reception unit 352 and a memory 354, and transmits data to and receives data from neighboring devices. The signal processing unit 360 includes an index information processing unit 362, a music decoder unit 364, and a speaker 366, and encodes and/or decodes index information and decodes music data.

The slave device 300*b* will now be explained in more detail.

The control unit 342 controls encoding and decoding of the index information processing unit 362, music decoding of the decoder unit 364, and transmission and reception of the data transmission and reception unit 352.

The memory 344 stores music files and a control program for the control unit 342.

The data transmission and reception unit 352 transmits data to and receives data from the master device 300*a* connected to a wired and/or wireless network through an antenna 302 under the control of the control unit 342 for transmission and reception.

The memory 344 stores a data transmission and reception program for the data transmission and reception unit 342.

The index information processing unit 362 has an index encoder/decoder.

When the operation mode is a transmission mode, the index information processing unit 362 enables the index encoder and processes the same index information as the master device 300*a*, and when the operation mode is in a reception mode, enables the index decoder and decodes index information (ID information+channel information+synchronization information) received from the master device 300*a* capable of wired and/or wireless communication.

The music decoder unit 364 confirms channel information from the index information decoded by the index information processing unit 362, and then decodes music data of the channel and outputs the decoded music data to the speaker 366.

The speaker 366 outputs an audio signal of the channel decoded by the music decoder unit 364.

Figure 4:
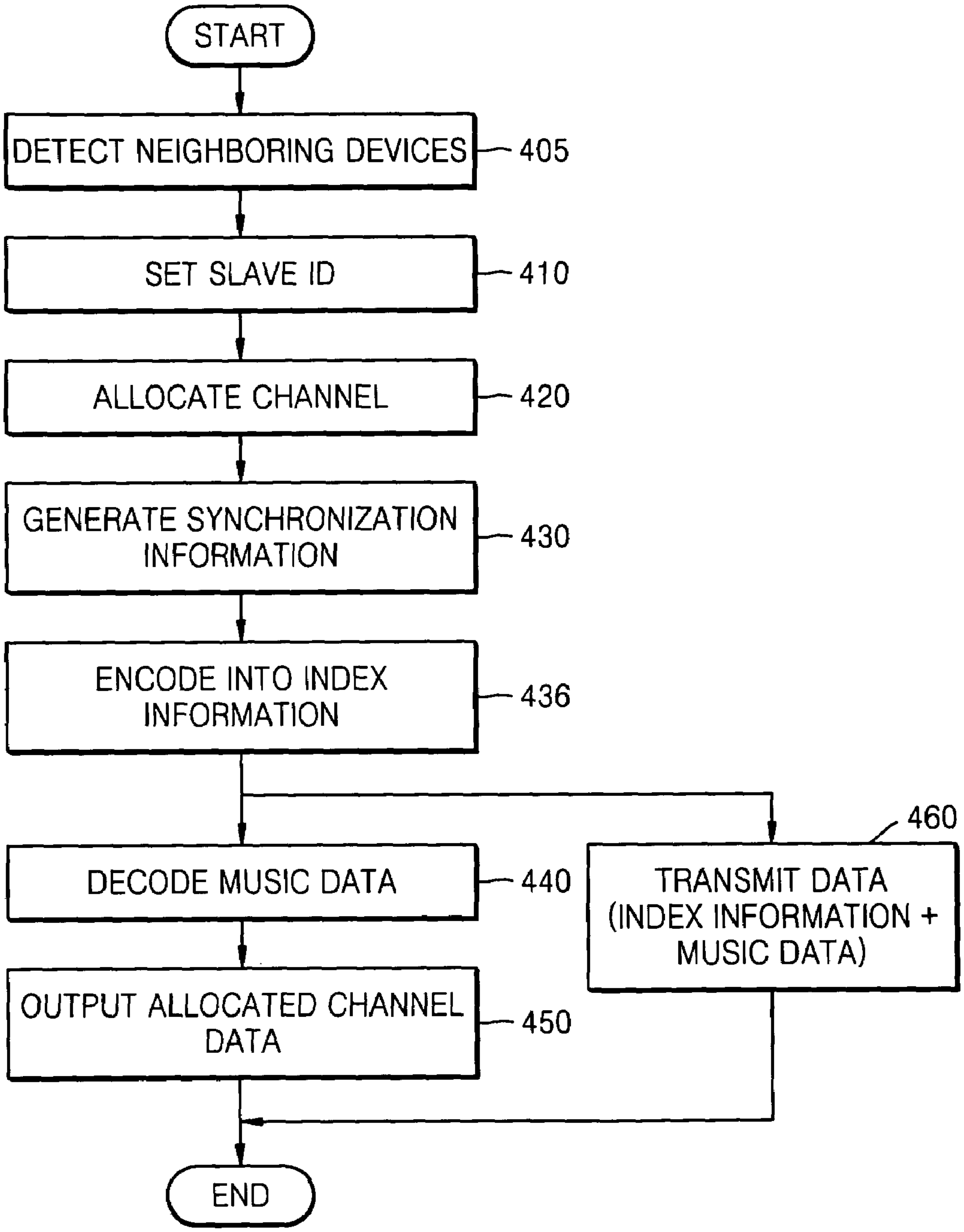
FIG. 4 is a flowchart illustrating the operation of a master device according to an embodiment of the present invention.

FIG. 4 is a flowchart illustrating the operation of a master device according to an embodiment of the present invention.

In operation 405, the master device detects neighboring devices (slave devices) equipped with wired and/or wireless communication systems.

Then, the master device assigns an ID to each of the detected slave devices in operation 410.

In operation 420, the master device allocates audio channel information to slave devices to which IDs were assigned. For example, assuming that one slave device exists and the music information to be reproduced is a 2-channel stereo file, a left channel may be allocated to the master device and a right channel may be allocated to the slave device. In one exemplary embodiment, the master device can allocate channels automatically by analyzing the channels supported by the music file and the number of slave devices. In another exemplary embodiment, channels can be allocated according to selection by a user. For example, when a 2-channel music file is desired to be reproduced using 3 slave devices, the user can arbitrarily assign a left channel to the master device and a first slave device, and a right channel to a second slave device and a third slave device.

In operation 430, the master device generates synchronization information to reproduce music simultaneously with each slave device. The synchronization information is appropriately generated with respect to the performance of the wired and/or wireless communication system, the performance of the music reproducing apparatus, and the type and size of the music file to be transmitted.

Then, in operation 436, the master device encodes the audio channel information together with the synchronization information into index information.

The index information includes ID information assigned to each slave device, channel information indicating which channel is allocated to which slave device, and the synchronization information for ensuring simultaneous reproduction of music by the master device and the slave devices.

Then, the master device adds the index information to music data packets and transmits the packets to each slave device in operation 460. At this time, the data transmission method complies with the transmission standard of a wired and/or wireless communication system mounted on the master device.

Meanwhile, if the role of the master device is changed to the role of a slave, the master device decodes music data in operation 440 and outputs data of a channel allocated to the master device in operation 450.

Figure 5:
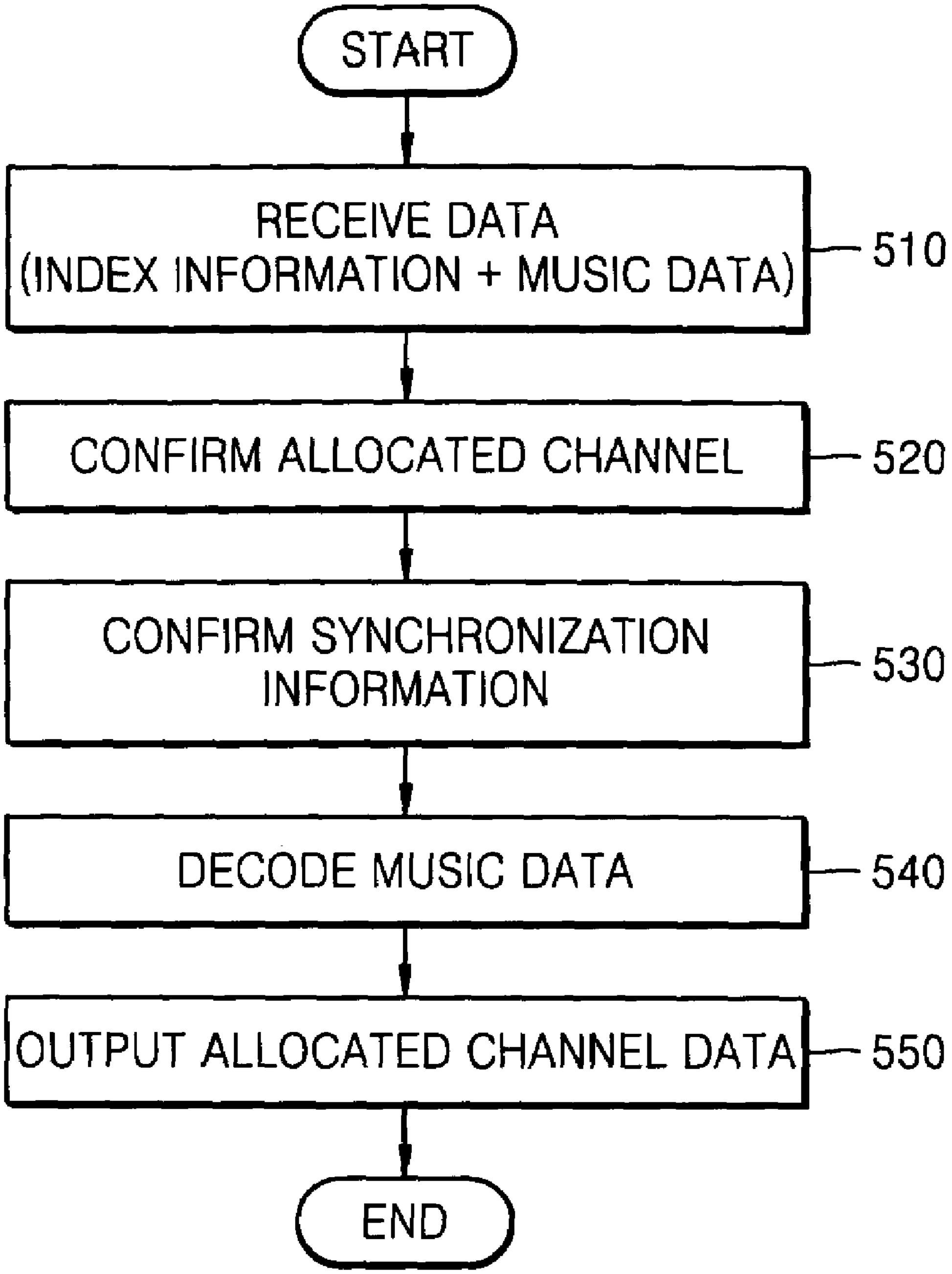
FIG. 5 is a flowchart illustrating the operation of a slave device according to an embodiment of the present invention.

FIG. 5 is a flowchart illustrating the operation of a slave device according to an embodiment of the present invention.

In operation 510, the slave device receives index information and music data.

Then, the slave device decodes the received index information and confirms audio channel information allocated to the slave device in operation 520. In operation 530, the slave device also confirms synchronization information to ensure that the music file of the channel allocated to the slave device is reproduced simultaneously with that of other devices.

Then, the slave device decodes music data among received data in operation 540.

In operation 550, the slave device outputs the appropriate audio channel signal from among the decoded music data, to a corresponding speaker.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as, for example, data transmission through the Internet). The computer readable recording medium can also be distributed over network coupled computer systems so that the computer readable code is stored and executed in a distributed fashion.

According to the present invention as described above, each device reproduces only audio data of a channel allocated to that device, so that a listener can enjoy sound with a stereo effect. Also, all devices supported by wired and/or wireless systems are used to reproduce music data, without the inconvenience of connecting separate external speakers. Accordingly, the present invention can be used for live performances as well as recorded music. Also, since each device can operate as a master or a slave as necessary, in addition to music files stored in one device, other music files stored in other devices can be reproduced without additional connections or cost.

What is claimed is:

1. A multi-channel music reproducing method using a plurality of communication devices of a music reproducing apparatus, the method comprising:

confirming neighboring communication devices, of a communication device, capable of wired and/or wireless communication;

allocating audio channel information to each confirmed neighboring device;

generating reproduction synchronization information according to a performance of the music reproducing apparatus, and a type and a size of a music file to be transmitted;

encoding the channel information and reproduction synchronization information;

receiving the channel information and reproduction synchronization information;

decoding the channel information allocated to a current communication device and reproduction synchronization information; and outputting music data corresponding to the allocated channel.

2. The method of claim 1, wherein the channel information and reproduction synchronization information is encoded into index information.

3. The method of claim 2, wherein the confirming neighboring communication devices comprises detecting neighboring devices capable of wired and/or wireless communication and assigning IDs to each detected neighboring device;

wherein the allocating audio channel information comprises allocating audio output channel information to each detected neighboring device;

wherein the generating the reproduction synchronization information comprises, generating the reproduction synchronization information to ensure that music is reproduced simultaneously from each neighboring device; and wherein the encoding the channel information and the reproduction synchronization information into index information comprises encoding the generated ID information, the audio channel information and the synchronization information into index information.

4. The method of claim 2, further comprising transmitting the channel information together with a music data file.

5. The method of claim 4, wherein the generating the reproduction synchronization information is performed by the music reproducing apparatus.

6. The method of claim 4, wherein the allocating of the channel information comprises analyzing a number of channels supported by the music file and a number of communication devices.

7. The method of claim 2, wherein the allocating of the channel information to each confirmed neighboring device is done by a user.

8. The method of claim 2, wherein the receiving the channel information and reproduction synchronization information comprises confirming the reproduction synchronization information in order to synchronize reproduction of music by an audio output channel allocated to a current communication device with audio output channels of other communication devices;

wherein the decoding the channel information and the reproduction synchronization information comprises decoding music data from among data received according to the reproduction synchronization information; and wherein the outputting music data corresponding to the allocated channel comprises selecting a signal of an audio channel to be output by the current communication device from among the decoded music data, and outputting the audio channel signal to a speaker.

9. The method of claim 1, further comprising receiving the channel information and the reproduction synchronization information together with the music data.

10. A multi-channel music reproducing apparatus, the apparatus comprising:

a master unit apparatus operable to detect slave devices capable of wired and/or wireless communication, allocate audio channel information to each detected slave device, generate reproduction synchronization information according to a performance of the music reproducing apparatus and a type of a music file to be transmitted, encode the channel information and reproduction synchronization information into index information, and transmit the index information together with a music data file; and at least one slave unit apparatus operable to receive the encoded index information and music data from the master unit, decode the channel information allocated to the at least one slave unit and synchronization information, and output music data corresponding to the allocated channel.

11. The apparatus of claim 10, wherein the master unit apparatus comprises:

a control unit operable to confirm slave devices capable of wired and/or wireless communication, assign an ID to each confirmed slave device, allocate audio channel information to each confirmed slave device, and generate the reproduction synchronization information to ensure that music is reproduced simultaneously with each confirmed slave device;

an index information processing unit operable to encode the ID information of each confirmed slave device assigned by the control unit, audio channel information of each confirmed slave device, and the reproduction synchronization information; and a data transmission and reception unit operable to add the index information processed in the index information processing unit to music file packets and transmit the music file packets to each confirmed slave device.

12. The apparatus of claim 10, wherein the slave unit apparatus comprises:

a data communication unit operable to receive index information and a music file in units of packets from the master unit;

an index information processing unit operable to decode the index information received from the data transmission and reception unit, and extract the channel information and the reproduction synchronization information; and a music decoder unit operable to confirm the channel information from the index information decoded by the index information processing unit, and decode music data of a corresponding channel from the music file received by the data transmission and reception unit.

13. A music reproducing apparatus, comprising:

a control unit apparatus operable to detect neighboring devices capable of wired and/or wireless communication, assign an ID to each detected neighboring device, allocate audio channel information to respective IDs, and generate reproduction synchronization information to ensure that audio is reproduced simultaneously with each detected neighboring device;

an information encoding unit apparatus operable to encode the ID information, the channel information and the reproduction synchronization information generated in the control unit into index information;

a transmission unit apparatus operable to add the index information processed in the information encoding unit to a music file and transmit the music file to each detected neighboring device;

a reception unit apparatus operable to receive the index information and the music file in units of packets from the transmission unit;

an information decoding unit apparatus operable to decode the index information received by the reception unit, and extract the channel information and the reproduction synchronization information; and a music decoder unit apparatus operable to confirm channel information from the index information decoded by the information decoding unit, and decode music data of a corresponding channel from the music file received by the reception unit;

wherein the reproduction synchronization information is generated according to a performance of the music reproducing apparatus and a type and a size of a music file to be transmitted.

14. A non-transitory computer-readable storage medium encoded with a program that causes a computer of a music reproducing apparatus to execute the steps of:

confirming neighboring communication devices, of a communication device, capable of wired and/or wireless communication;

allocating audio channel information to each confirmed neighboring device;

encoding the channel information and reproduction synchronization information into index information;

generating reproduction synchronization information according to a performance of the music reproduction apparatus and a type and a size of a music file to be transmitted;

transmitting the index information together with a music data file;

receiving the encoded index information and music data;

decoding the channel information allocated to a current communication device and reproduction synchronization information; and outputting music data corresponding to the allocated channel.

15. A multi-channel music reproducing method using a music reproducing device capable of wired and/or wireless communication, the method comprising:

a first music reproducing apparatus detecting neighboring music reproducing apparatuses capable of wired and/or wireless communication;

allocating audio channel information to the first music reproducing apparatus and at least one of the detected neighboring music reproducing apparatuses capable of wired and/or wireless communication; and synchronizing the first music reproducing apparatus with the at least one of the detected neighboring music reproducing apparatuses to which the audio channel information is allocated and reproducing the music;

wherein the synchronizing comprises generating reproduction synchronization information according to a performance of the music reproducing apparatus and a type of a music file to be transmitted.

16. The method of claim 15, wherein the allocating of the audio channel information comprises analyzing the number of the detected neighboring music reproducing apparatuses capable of wired and/or wireless communication.

17. The method of claim 15, further comprising: transmitting music data to be reproduced.

18. A multi-channel music reproducing apparatus comprising:

a control unit apparatus operable to confirm slave devices capable of wired and/or wireless communication, allocate audio channel information to each confirmed slave device, and generate reproduction synchronization information to ensure that music is reproduced simultaneously with each confirmed slave device;

an index information processing unit apparatus operable to encode the audio channel information of each confirmed slave device and the synchronization information; and a data transmission and reception unit apparatus operable to transmit the audio channel information and synchronization information encoded in the index information processing unit;

wherein the reproduction synchronization information is generated according to a performance of the music reproducing apparatus and a type of music file to be transmitted.

* * * * *